(12) United States Patent
Nakano

(10) Patent No.: US 7,907,862 B2
(45) Date of Patent: Mar. 15, 2011

(54) IMAGE FORMING APPARATUS, IMAGE FORMING METHOD, PROGRAM, AND STORAGE MEDIUM

(75) Inventor: Toshimitsu Nakano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 860 days.

(21) Appl. No.: 11/850,237

(22) Filed: Sep. 5, 2007

(65) Prior Publication Data
US 2008/0151312 A1 Jun. 26, 2008

(30) Foreign Application Priority Data
Dec. 20, 2006 (JP) ................. 2006-343057

(51) Int. Cl.
*G03G 15/00* (2006.01)
*G03G 15/10* (2006.01)
*G03G 15/01* (2006.01)
*G03G 15/20* (2006.01)
*H04N 1/40* (2006.01)

(52) U.S. Cl. ............... 399/72; 399/49; 399/60; 399/302; 399/308; 358/3.28

(58) Field of Classification Search ............ 399/49, 399/60, 72, 84, 302, 308; 358/3.28
See application file for complete search history.

(56) References Cited

U.S. PATENT DOCUMENTS

| 7,039,215 | B2 | 5/2006 | Suzaki |
| 7,085,399 | B2 | 8/2006 | Suzaki |
| 2005/0232648 | A1* | 10/2005 | Nishizawa et al. ........... 399/49 |
| 2007/0081841 | A1 | 4/2007 | Nakano |
| 2007/0237533 | A1* | 10/2007 | Hanashi et al. ............. 399/49 |

FOREIGN PATENT DOCUMENTS

JP 2003-101762 4/2003

* cited by examiner

*Primary Examiner* — David M Gray
*Assistant Examiner* — Joseph S Wong
(74) *Attorney, Agent, or Firm* — Fitzpatrick, Cella, Harper & Scinto

(57) ABSTRACT

In order to determine the image quality of an encoded image in consideration of the printing characteristic of an output apparatus (e.g., a copying machine and a printer), the image forming apparatus has an intermediate formation unit for forming dots that are based on dot data making up an encoded image on an intermediate transfer body, and a decision unit for deciding whether the encoded image should be formed on a sheet or not based on the density of the dots formed on the intermediate transfer body by the intermediate formation unit.

9 Claims, 14 Drawing Sheets

STRUCTURE OF DOT DATA

STRUCTURE OF CELLS OF THE ENCODED IMAGE

PRINTING IMAGE DATA INCLUDING ENCODED IMAGE

FIG. 6

PATCH IMAGES PRINTED ON SHEET (a) 1×1

| -2  | -24 | -27 | -24 | -2  |
|-----|-----|-----|-----|-----|
| -24 | 62  | 62  | 9   | -24 |
| -27 | 9   | 152 | 62  | -27 |
| -24 | -24 | 62  | 9   | -24 |
| -2  |     | -27 | -24 | -2  |

FIG. 7B

| 0  | -2 | -5 | -6 | -5 | -2 | 0  |
|----|----|----|----|----|----|----|
| -2 | -7 | -6 | -2 | -6 | -7 | -2 |
| -5 | -6 | 18 | 39 | 18 | -6 | -5 |
| -6 | -2 | 39 | 64 | 39 | -2 | -6 |
| -5 | -6 | 18 | 39 | 18 | -6 | -5 |
| -2 | -7 | -6 | -2 | -6 | -7 | -2 |
| 0  | -2 | -5 | -6 | -5 | -2 | 0  |

FIG. 8

| DOT SIZE | DOT RECOGNITION |
|---|---|
| (a) 1×1 | IMPOSSIBLE |
| (b) 2×2 | IMPOSSIBLE |
| (c) 3×3 | IMPOSSIBLE |
| (d) 4×4 | POSSIBLE |
| (e) 5×5 | POSSIBLE |
| (f) 6×6 | POSSIBLE |
| (g) 7×7 | POSSIBLE |

| DOT SIZE | DOT RECOGNITION | MEASURED DENSITY VALUE |
|---|---|---|
| (a) 1×1 | IMPOSSIBLE | 6 |
| (b) 2×2 | IMPOSSIBLE | 15 |
| (c) 3×3 | IMPOSSIBLE | 26 |
| (d) 4×4 | POSSIBLE | 30 |
| (e) 5×5 | POSSIBLE | 42 |
| (f) 6×6 | POSSIBLE | 51 |
| (g) 7×7 | POSSIBLE | 58 |

FIG. 14

WARNING

DOTS OF ENCODED IMAGE
MAY NOT BE RECOGNIZED

IMAGE FORMING APPARATUS, IMAGE FORMING METHOD, PROGRAM, AND STORAGE MEDIUM

BACKGROUND OF THE INVENTION

1. Field of the Invention

The present invention relates to an image forming apparatus that is capable of handling encoded images, a control method for the image forming apparatus, a program, and a storage medium.

2. Description of the Related Art

For guarantee of authenticity, prevention of tampering, and/or attachment of additional information for an important document, the following technique is known. Information is encoded to generate an encoded image, and the generated encoded image is formed and printed on a sheet (i.e., a printing medium) with an image of a document.

Then, the printed image on the sheet is read with a reader, the encoded image is extracted from information that has been read off, and the extracted encoded image is decoded to retrieve information.

The contents of a printed encoded image cannot be recognized by a user as it is. By capturing the encoded image as image data using a reader and applying corresponding decoding processing to the image data, the user can recognize the contents of the encoded image.

In general, image data that has been read off is transferred to a computer and decoded by an application program that runs on the computer. Aside from this method, however, an encoded image can also be decoded inside a reader by means of a mobile telephone that supports two-dimensional codes, or can be decoded inside a copying machine having a number of functions.

An encoded image is typically made up of dots, and is formed and printed on a sheet together with text and/or images which are to be printed with a size that allows the dots to be reliably recognized as dots of an encoded image when being read by a reader.

As a technique for printing an encoded image on a sheet, a technique is generally known that embeds code information which gives directivity to a calculated rectangular size in consideration of an encoded image and the size of paper sheets for printing (e.g., Japanese Patent Application Laid-Open No. 2003-101762).

However, conventional generation processing of an encoded image does not take into consideration the printing characteristic of an output device (e.g., a copier and a printer) that varies with differences between individual machines, environmental changes, and lapse of time. Accordingly, even if an encoded image is generated with dot data of a predetermined size that can be recognized as dots, the dots become smaller due to variation of the printing characteristic of the output device and cannot be recognized as dots at the time of reading. This problem leads to a problem that the encoded image cannot be recognized as an encoded image at the time of reading.

The present invention has been made in view of these problems and has an object of preventing an encoded image that will be unrecognizable as an encoded image at the time of reading from being printed on a sheet.

SUMMARY OF THE INVENTION

To attain the above object, an image forming apparatus according to the present invention has the following configuration.

Specifically, the image forming apparatus has an intermediate formation unit for forming dots that are based on dot data making up an encoded image on an intermediate transfer body; and a decision unit for deciding whether the encoded image should be formed on a sheet or not based on the density of the dots formed on the intermediate transfer body by the intermediate formation unit.

According to the invention, it is possible to prevent an encoded image that will be unrecognizable as an encoded image at the time of reading from being printed on a sheet.

Further features of the present invention will become apparent from the following description of exemplary embodiments with reference to the attached drawings.

BRIEF DESCRIPTION OF THE DRAWINGS

FIG. 6 illustrates a measurement patch image.

FIG. 7A illustrates a mask pattern 1 for determining dot recognizability and FIG. 7B illustrates a mask pattern 2 for determining dot recognizability.

FIG. 8 illustrates a dot definition table.

FIG. 14 illustrates a warning display.

DESCRIPTION OF THE EMBODIMENTS

An exemplary embodiment for carrying out the present invention will be described below with reference to drawings.

First Embodiment

Figure 1:
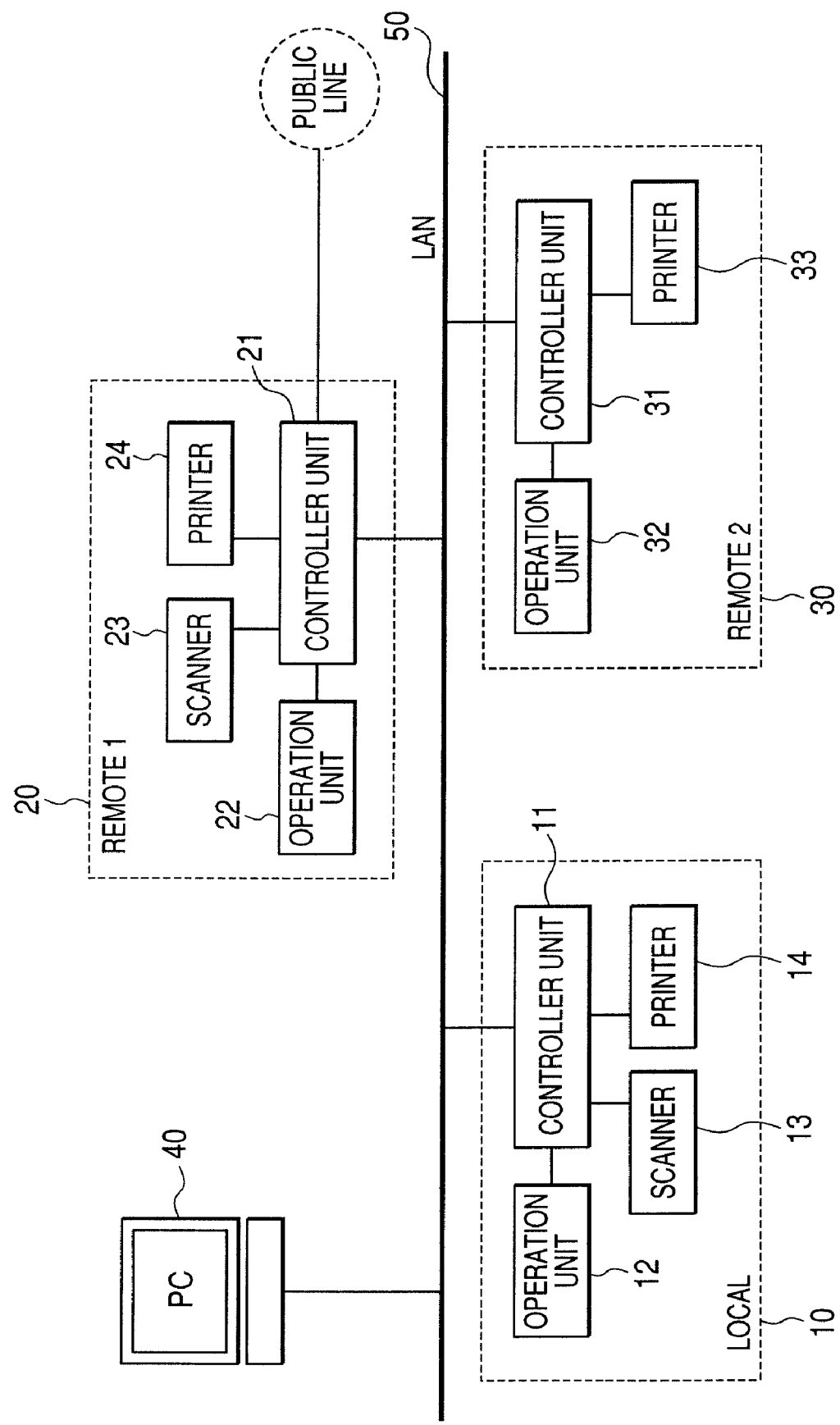
FIG. 1 illustrates the overall configuration of an image forming (printing) system.

Printing System (FIG. 1)

A first embodiment will be described in detail with reference to drawings. FIG. 1 is a block diagram illustrating a configuration of a printing system according to the embodiment of the invention. While in this system a host computer 40 and three image forming apparatuses (10, 20, 30) are connected to a LAN 50, the number of connections is not limited to the illustrated ones in the printing system of the invention. In addition, although this embodiment applies a LAN as a way of connection, this is not limitation. For example, it is also possible to apply an arbitrary network such as a WAN (a public line), a serial transmission method such as USB, and a parallel transmission method such as Centronics and SCSI.

The host computer (hereinafter called a PC) 40 has the functions of a personal computer. The PC 40 is capable of transmitting and receiving files and/or electronic mail via the LAN 50 or a WAN using the FTP or SMB protocol. The PC 40 can also issue a printing instruction via a printer driver to the image forming apparatuses 10, 20 and 30.

The image forming apparatuses 10 and 20 have the same configuration. The image forming apparatus 30 is an image forming apparatus only with printing function and does not have a scanner unit provided in the image forming apparatuses 10 and 20. In the following, for the sake of brevity, attention will be focused on the image forming apparatus 10 out of image forming apparatuses 10 and 20 and its configuration will be described in detail.

The image forming apparatus 10 includes a scanner unit 13 as an image input device, a printer unit 14 as an image output device, a controller (Controller Unit) 11 responsible for controlling the overall operation of the image forming apparatus 10, and an operation unit 12 as a user interface (UI).

Figure 2:
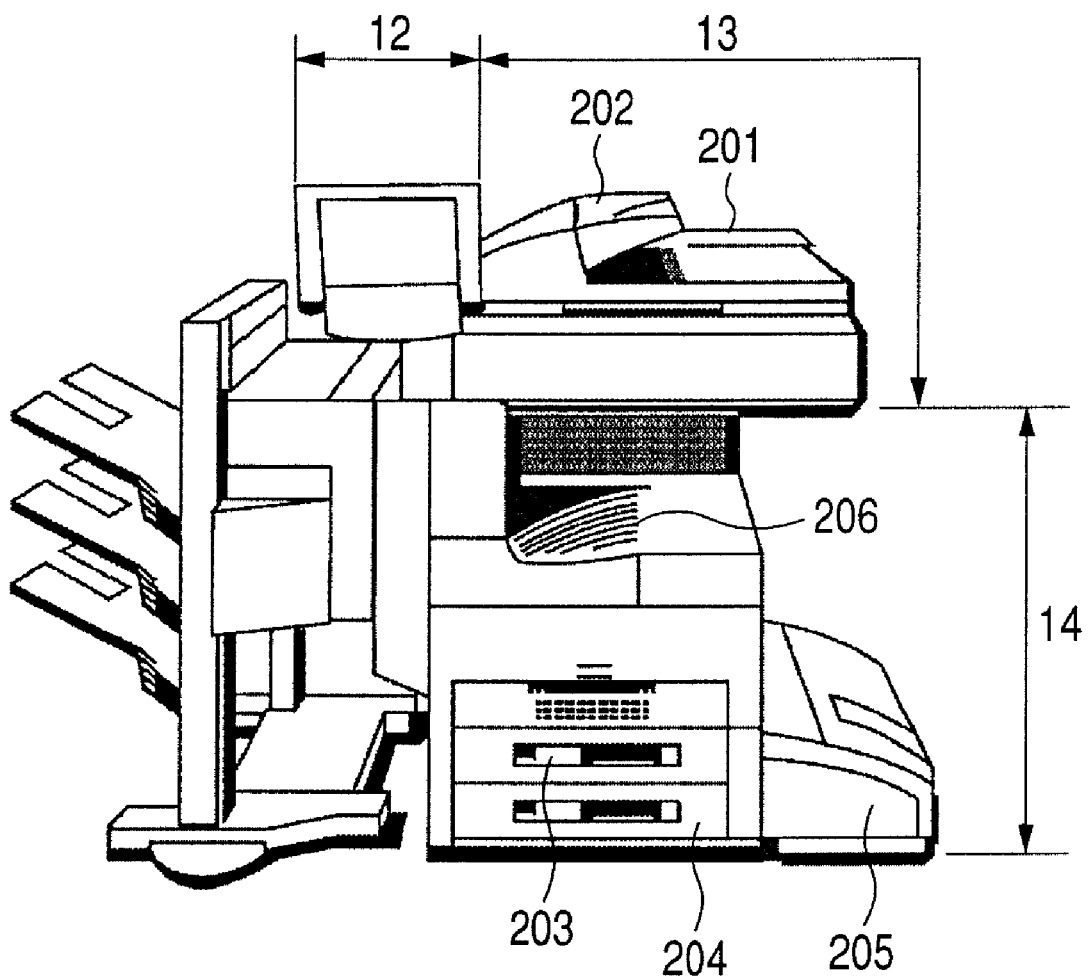
FIG. 2 illustrates the outer appearance of an image forming apparatus 10.

Image Forming Apparatus 10 (FIG. 2)

The outer appearance of the image forming apparatus 10 is illustrated in FIG. 2. The scanner unit 13 inputs reflected light resulting from exposure scanning of an image on a document platen to a CCD so as to convert information on the image into an electrical signal. The scanner unit further converts the electrical signal into a luminance signal including R, G and B colors, and outputs the luminance signal as image data to the controller 11.

Documents are set in a tray 202 of a document feeder 201. When the user directs start of scanning from the operation unit 12, a document scanning instruction is given from the controller 11 to the scanner 13. In response to the instruction, the scanner unit 13 feeds the documents from the tray 202 of the document feeder 201 one by one to perform document scanning operation. Document scanning may also be performed by a method in which a document is placed on a platen glass not shown and an exposure unit is moved so as to scan the document, rather than the automated feeding by the document feeder 201.

The printer unit 14 is an image forming device for forming document image data received from the controller 11 on a sheet. The printer unit 14 is equipped with a plurality of paper cassettes 203, 204 and 205 which enables selection from different paper sizes or different paper orientations. Onto an output tray 206, printed sheets are ejected.

Figure 3:
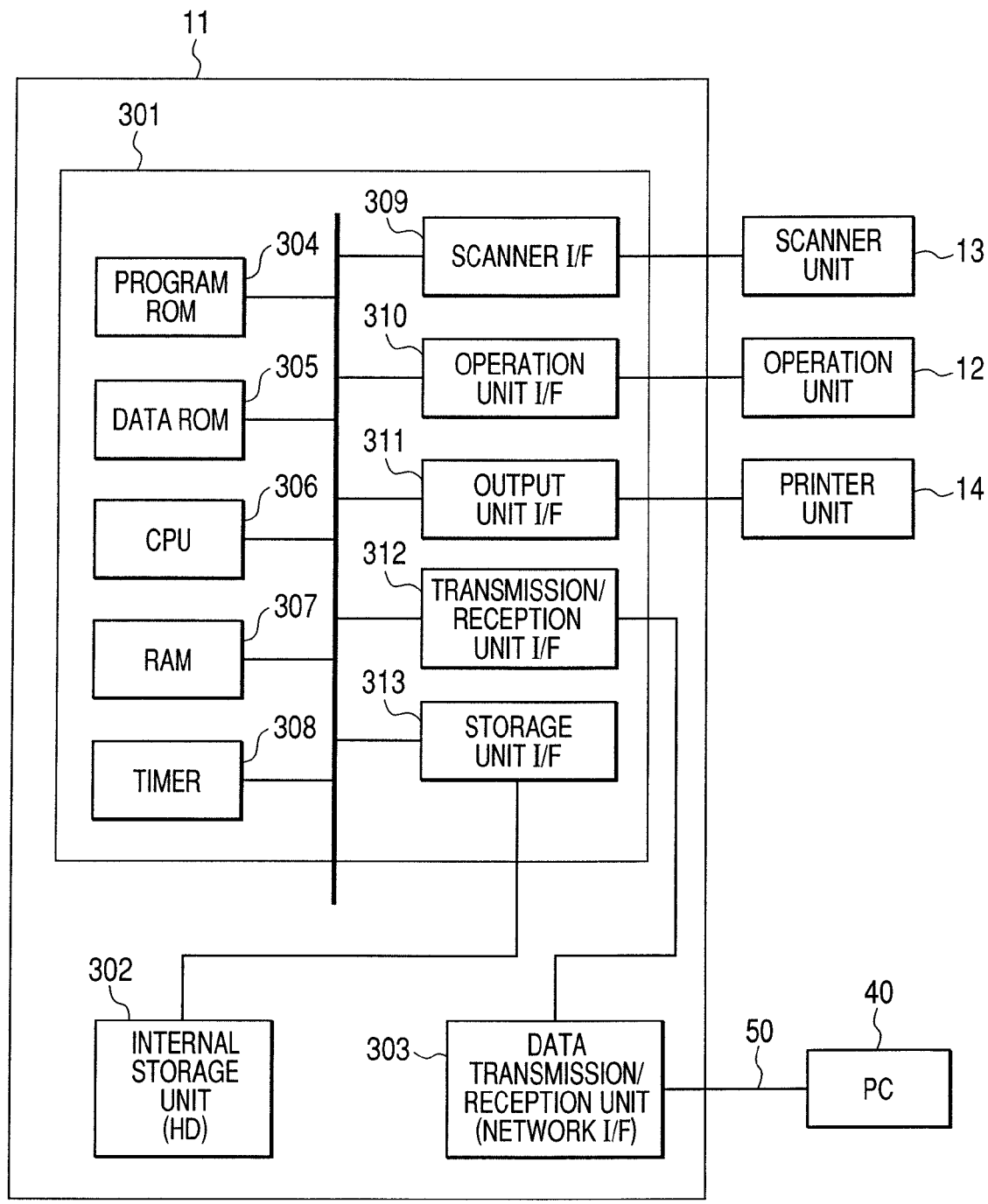
FIG. 3 is a block diagram of the image forming apparatus 10.

Detailed Description of the Controller 11 (FIG. 3)

The controller 11 includes the processing units described below.

The controller 11 is electrically connected with the scanner unit 13 and printer unit 14 while being connected to the PC 40 and/or external apparatuses via the LAN 50. This enables input and output of image data and/or device information.

The scanner unit 13 is an input unit for images for scanning. The operation unit 12 may be a UI panel. A data processing unit 301 may be a video controller. An internal storage unit 302 may be an HD. An image transmission/reception unit 303 may be a host computer, a network I/F board, and a facsimile machine. The printer unit 14 outputs images. Although the embodiment described herein uses a copying machine that integrates a printer, a copier with a scanner, and a facsimile machine and is connected to the host computer 40, this is not limitation.

The data processing unit 301 includes an input unit I/F 309, a setting unit I/F 310, an output unit I/F 311, a transmission/reception I/F 312, a storage device I/F 313, a program ROM 304 in which data processing and control programs are stored, a data ROM 305, a CPU 306, a RAM 307 as an internal storage unit, and a timer 308 (clock function). These processing units are connected by an internal bus.

Document image data is captured into the data processing unit 301 by scanning a document with the scanner unit 13, or receiving via the image transmission/reception unit 312 image data transmitted by way of an external host computer, an external facsimile machine, or a network.

The image data captured into the data processing unit 301 is subjected to image processing according to an operation environment set on the operation unit 12 or operation environment information included in document image data which is externally transmitted. Subsequently, the document image data after image processing is sent to the printer unit 14 when the document image data will be printed on the printing apparatus, to the data transmission/reception unit 303 when printing data will be transmitted to an external network, and to the internal storage unit 302 when the document image data will be saved in the printing apparatus.

When the data processing unit 301 processes document image data, the data processing unit 301 references information in the data ROM 305 and the like as necessary. The data processing unit 301 also executes image processing by reading a program from the program ROM 304 according to a processing operation environment acquired via the setting unit I/F 310 and utilizing the RAM 307 and/or the internal storage unit 302.

Structure of an Encoded Image

An encoded image is generated by applying encoding processing to original information (original information can include the contents of a document, a PIN code, a device number, printing time information, and user ID information, for example).

Although in this embodiment encoding processing is performed by an application program on the host computer 40, encoding may also be performed by reading a program from the program ROM 304 of the data processing unit 301 of the image forming apparatus and utilizing the RAM 307 and/or the internal storage unit 302.

In the present specification, an encoded image refers to an image such as a two-dimensional code image, an electronic watermark image generated with an electronic watermark technique, and/or a steganography.

Figure 4C:
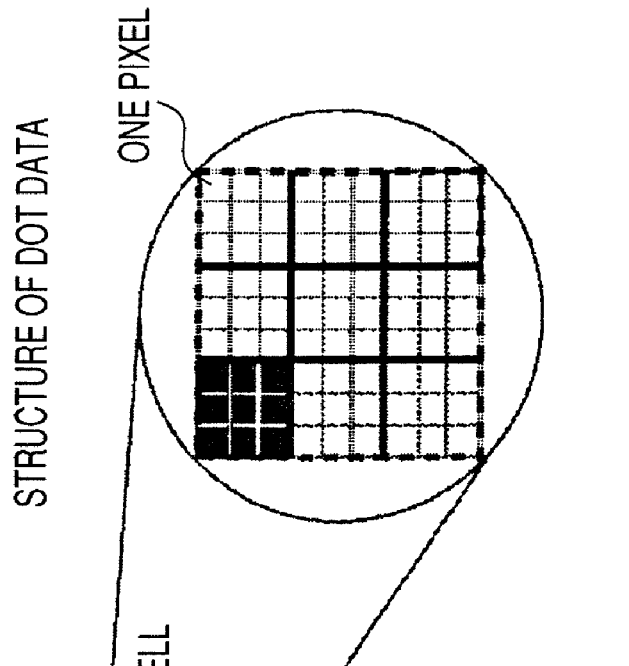
FIGS. 4A, 4B and 4C illustrate the structures of an encoded image.
Figure 4B:
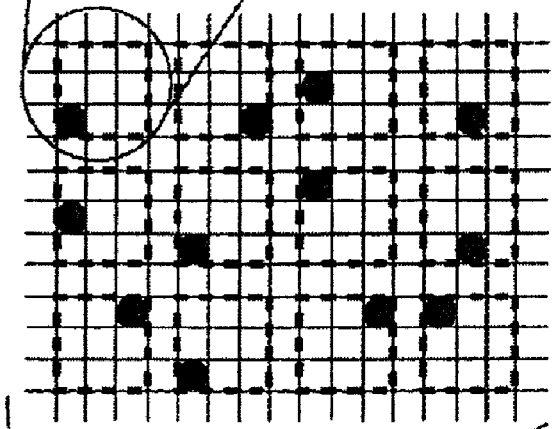
Figure 4A:
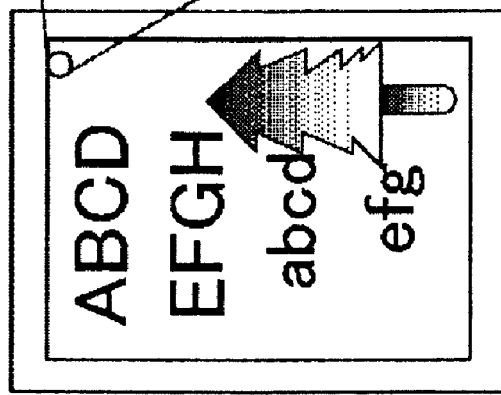

FIGS. 4A, 4B and 4C illustrate the structure of encoded image data.

FIG. 4A illustrates printing image data which is generated by combining encoded image data and document image data.

The encoded image data is represented as a collection of dot data in units of cells. FIG. 4B illustrates the structure of cells. One cell may represent 1 bit of original information (i.e., one cell represents one of "1" and "0"), or one cell may represent a number of bits. In this embodiment, one cell represents 3 bits (i.e., 8 values). For example, 3 bits of original information is represented by which position of a cell having a size of 9×9 pixels is occupied by dot data of 3×3 pixels.

Also, dot data making up encoded image data is formed on a sheet to become dots on the sheet, and the dots on the sheet further need to have a size that allows the dots to be recognized as dots when scanned by the scanner unit 13. FIG. 4C illustrates an example of dot data included in one cell. In this embodiment, dot data has a size of 3×3 pixels.

Dot Size Decision Processing 1

Dot size decision processing 1 is performed independently of generation processing of an encoded image. Dots making up an encoded image need to have a dot size that can be recognized as a dot when scanned by a scanning apparatus.

The dot size decision processing 1 is a process for deciding the smallest dot size that can be recognized as a dot. The dot size decision processing 1 is performed periodically or at an arbitrary time by one of a user and an administrator. The result of the decision processing is stored in the controller 11 and also sent to the host computer 40.

Figure 5A:
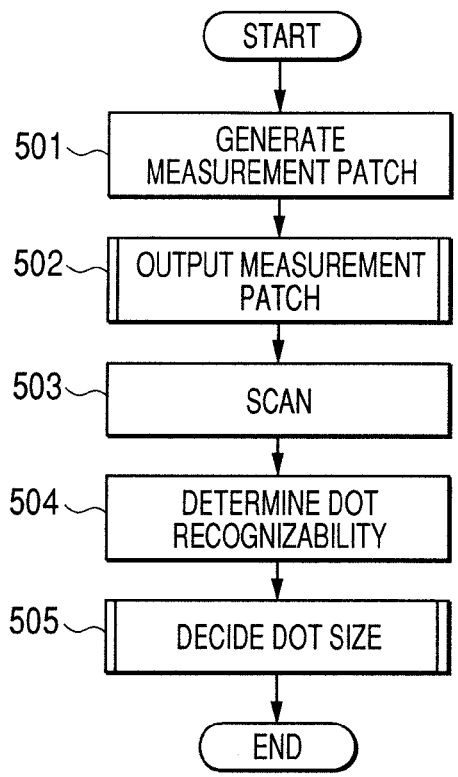
FIG. 5A is a flowchart showing dot size decision processing 1 (dot size decision processing in a first embodiment)

FIG. 5A illustrates a process flow of the dot size decision processing 1.

Step 501: A measurement patch (image) is generated. In this embodiment, the measurement patch is generated with dot sizes of seven patterns illustrated from (a) to (g) of FIG. 6. The patterns are a 1×1 dot size ((a) of FIG. 6), a 2×2 dot size ((b) of FIG. 6), a 3×3 dot size ((c) of FIG. 6), a 4×4 dot size ((d) of FIG. 6), a 5×5 dot size ((e) of FIG. 6), a 6×6 dot size ((f) of FIG. 6), and a 7×7 dot size ((g) of FIG. 6).

Step 502: Step 502 has steps 502-1 and 502-2. At step 502-1, image data for the generated measurement patch is sent to the printer unit 14, and an image made of a color material (e.g., a toner image) is formed on an intermediate transfer body using the image data for the patch. At step 502-2, the color material image formed on the intermediate transfer body is transferred onto a sheet so as to form a patch image on the sheet.

Figure 5B:
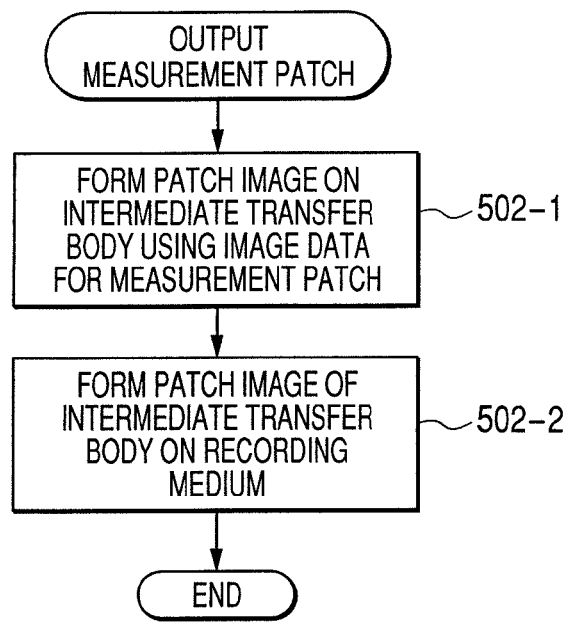
FIG. 5B shows the detailed process at step 502 of the dot size decision processing 1.

The measurement patch to be output is not limited to black and may be generated and output as a patch of any of a number of colors. Steps 502-1 and 502-2 are illustrated in FIG. 5B.

Step 503: The measurement patch output at step 502 is scanned by the scanner unit 13 (i.e., optically read). The scanned patch image is temporarily stored in the RAM 307 as patch image data via the input unit I/F 309.

With a color scanner, the patch image data is decomposed into signals of three channels, red, green and blue, and captured as multivalued data. With a one-channel scanner, the patch image data is captured as multivalued data as a gray signal.

Step 504: The patch image data stored at step 503 is used to determine whether the dots of the patch image can be recognized as dots. That is to say, it is determined whether the dots of the patch image are sharp or not.

More specifically, convolution operation between a mask pattern for sharpening edges and the patch image data obtained by scanning the dots of the patch image is performed. Then, if the greatest value (or a peak value) in calculated data is equal to or greater than a threshold value, it is determined that the dots of the patch image are sharp.

Determination of dot recognizability (i.e., determination of whether dots can be recognized as dots or not) is performed through convolution operation between the mask patterns illustrated in FIGS. 7A and 7B and the patch image data temporarily stored in the RAM 307 at step 503. The mask patterns illustrated in FIGS. 7A and 7B will have different sizes and mask pattern coefficients depending on the size of patch image data for determination.

For example, the mask pattern illustrated in FIG. 7A is utilized for image data obtained by scanning the areas illustrated in (a), (b) and (c) of FIG. 6, and the mask pattern illustrated in FIG. 7B is utilized for image data obtained by scanning the areas illustrated in (d) and (e) of FIG. 6. For image data obtained by scanning the areas illustrated in (f) and (g) of FIG. 6, coefficients for a mask pattern of a larger size are used. Mask patterns are prestored in the internal storage device 302. The result of convolution operation is stored in the RAM 307 by the CPU 306.

As the result of convolution operation, a peak value is present in a portion of each pattern of patch image data each time patch image data is processed. In this embodiment, a detected value is calculated with Equation (8) below:

$$|\text{Detected Value}| = \text{Peak Value} \quad (8)$$

Then, the detected value is compared with a threshold value Thre for determination.

$$\text{If (Detected Value} \geq \text{Thre}[i]\text{), determine } [i] = 1 \quad (9)$$

$$\text{else determine } [i] = 0 \quad (10)$$

where i represents each pattern of patch image data.

When the result of determination is "1", it means that the dot size can be recognized as a dot and is applicable to an encoded image. When the result is "0", it means that the dot size is not applicable to an encoded image because the dots are difficult to recognize.

Threshold: since it is more effective to adaptively change the threshold value Thre to a dot size, this embodiment also changes the threshold value Thre.

Figure 5C:
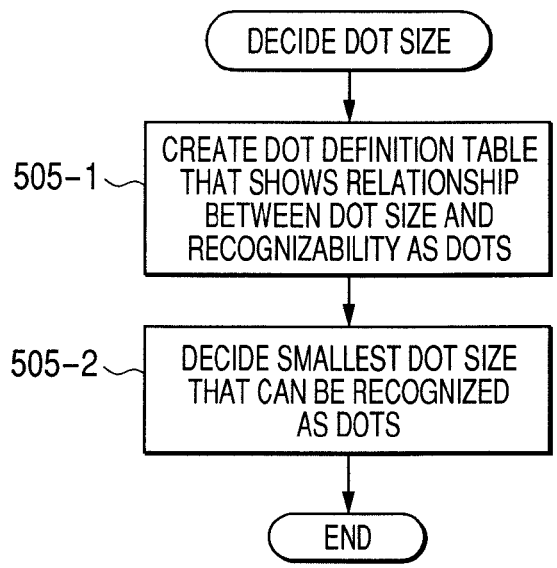
FIG. 5C shows the detailed process at step 505 of the dot size decision processing 1.

Step 505: Step 505 has steps 505-1 and 505-2. At step 505-1, a dot definition table that shows the correspondence relationship between dot sizes and dot recognizability is created. At step 505-2, from the dot definition table, the smallest dot size among dot sizes that can be recognized as dots is decided as the size of dot data that makes up an encoded image. Steps 505-1 and 505-2 are illustrated in FIG. 5C.

FIG. 8 illustrates a dot definition table created in the processing at step 505-1 that shows the relationship between dot sizes and the result of determination of whether dot recognition is possible or not. The dot definition table has an index 801. In 802, the result of determination from this flow is stored.

Then at step 505-2, from the dot definition table illustrated in FIG. 8, (d) of FIG. 8 is identified as the smallest dot size among dot sizes that can be recognized as dots, and 4×4 is decided as the size of dot data.

While this embodiment tests seven dot sizes in order to grasp the characteristic of the output device, more or less dot sizes may be tested.

In addition, when a condition is found in which all calculation results are "0" in the dot definition table 802, that is, all the dot sizes are determined not to be recognizable, the user is notified of the condition on the operation unit 12. Although the notification may simply be displayed on the operation unit 12, information may also be transmitted to a driver (not shown) utilized by the host computer 40. Furthermore, notification may also be made to a management server (not shown).

As has been described above, this embodiment can decide the optimal dot size in consideration of varying printing characteristics.

Second Embodiment

In the first embodiment, patch image data is formed on a sheet and the formed image on the sheet is scanned to decide the size of dots for use in generation of an encoded image.

In general, however, the printing characteristic of an image forming apparatus substantially changes, and the smallest dot size changes over time. Accordingly, even when another apparatus transmits to the image forming apparatus 10 encoded image data that is made up of dot data of a larger size than the smallest dot size decided at step 905, it is unpredictable at the point of the transmission whether or not the dot data of the larger size will be later recognized as dots.

Accordingly, this embodiment prevents useless sheet output by giving a warning to the user when printing image data including encoded image data transmitted from another apparatus may not be subsequently recognized as an encoded image even if the printing image data is formed on a sheet.

The second embodiment will be described in detail below. In the second embodiment, dot size decision processing 2 is performed in place of the dot size decision processing 1 of the first embodiment 1.

Dot Size Decision Processing 2

Figure 9A:
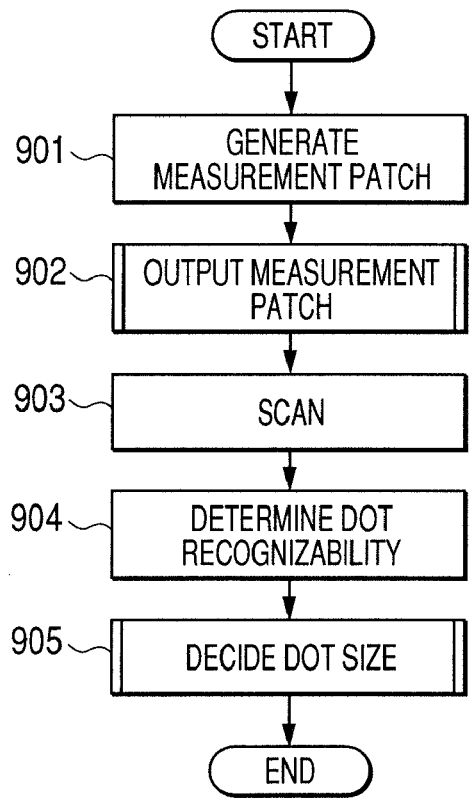
FIG. 9A is a flowchart showing dot size decision processing 2 (dot size decision processing in a second embodiment)
Figure 9B:
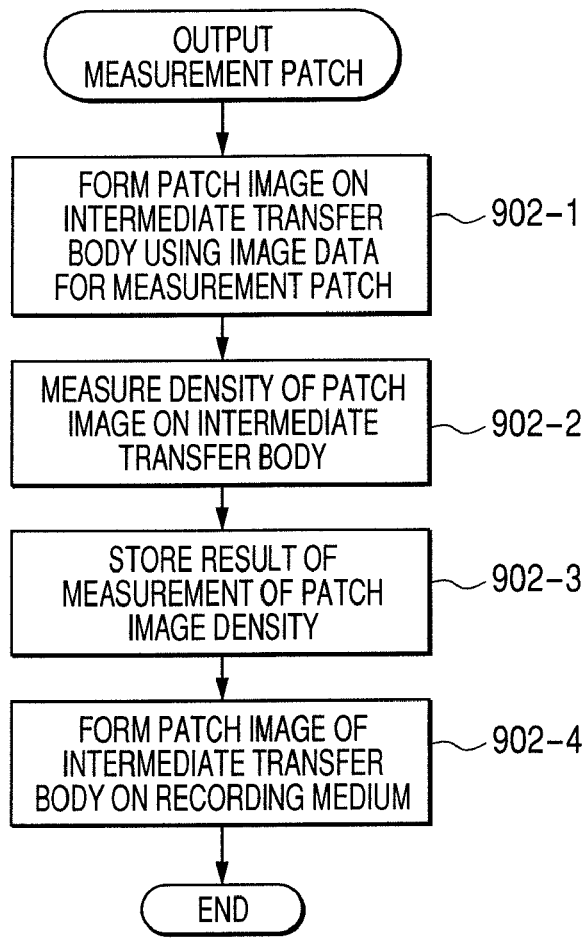
FIG. 9B shows the detailed process at step 902 of the dot size decision processing 2.
Figure 9C:
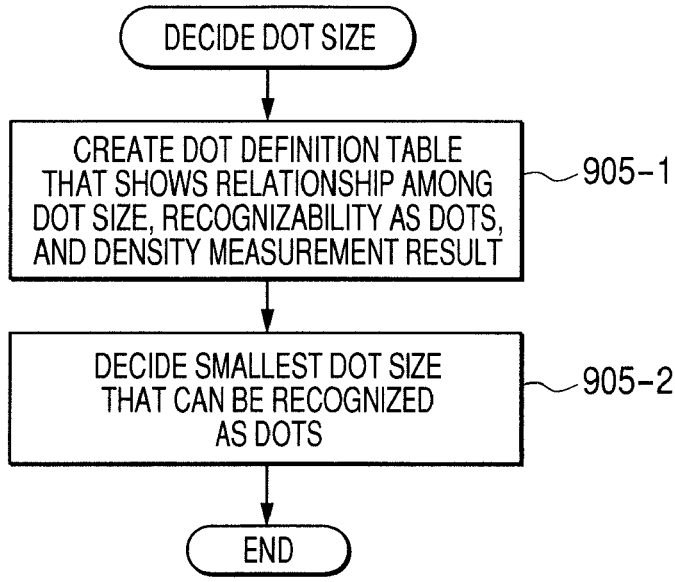
FIG. 9C shows the detailed process at step 905 of the dot size decision processing 2.

The process flow of the dot size decision processing 2 is illustrated in FIG. 9A, a detailed process flow at step 902 of FIG. 9A is illustrated in FIG. 9B, and a detailed process flow at step 905 of FIG. 9A is illustrated in FIG. 9C.

The dot size decision processing 2 of the second embodiment includes steps 902-2 and 902-3 of FIG. 9B in addition to the steps of the first embodiment 1. In addition, processing at step 905-1 in FIG. 9C is different from the processing at step 505-1 of FIG. 5C in the first embodiment.

Thus, processing at steps 902-2, 902-3 and 905-1 will be described.

Figure 10:
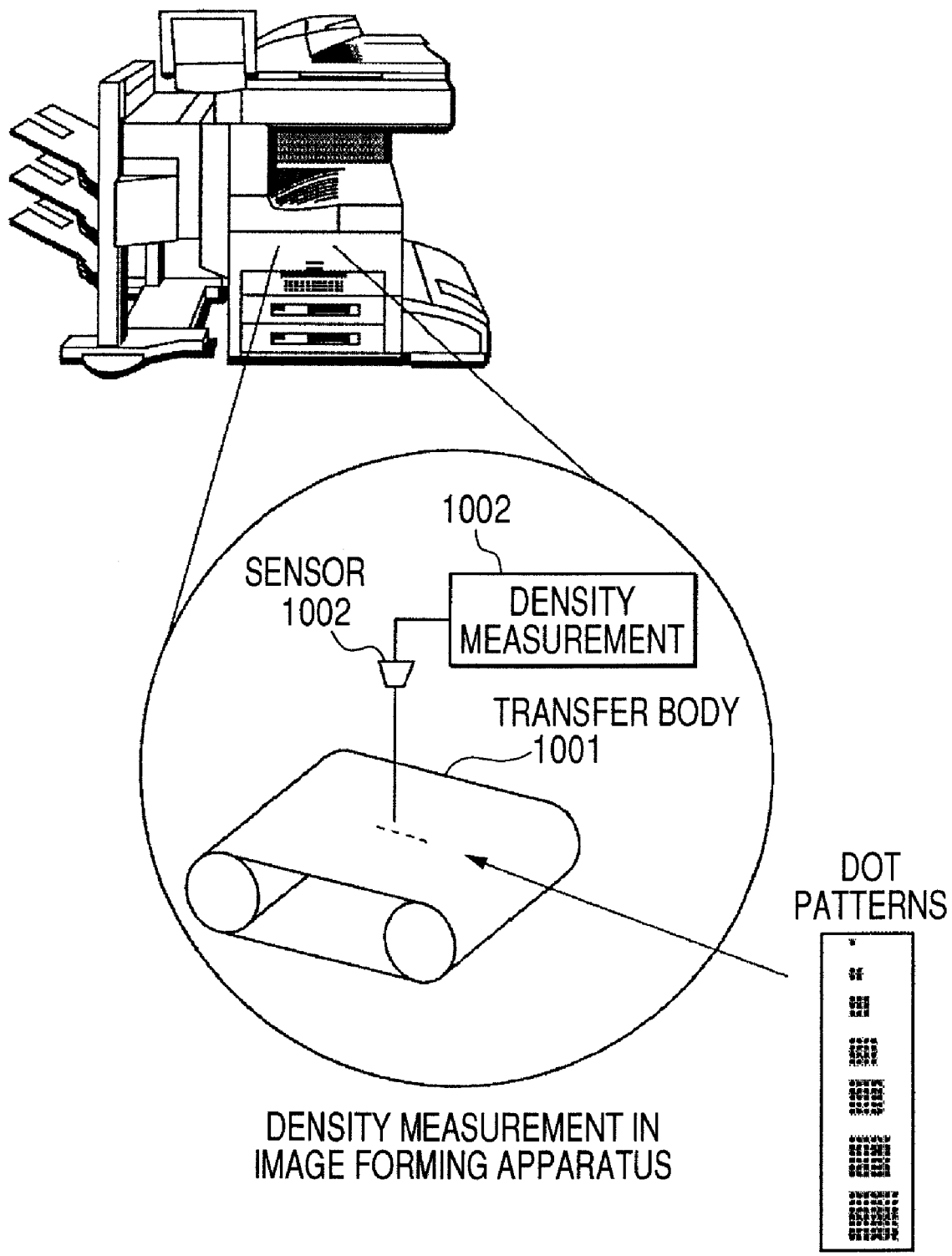
FIG. 10 illustrates density measurement in the image forming apparatus 10.

At step 902-2, the density of the color material image formed on an intermediate transfer body 1001 in the printer unit 14 is measured using a sensor 1002 in the printer unit 14. FIG. 10 illustrates the intermediate transfer body 1001 and the sensor for measuring the density of a color material image formed on the intermediate transfer body 1001. In this way, at step 902-2, density is measured with the sensor 1002 for a plurality of dots having different sizes formed on the intermediate transfer body 1001.

At step 902-3, the result of measurement with the sensor 1002 of the printer unit 14 (a measured density value) is sent from the printer unit 14 via the output unit I/F 311 to the RAM 307 for storage.

At step 905-1, a dot definition table is created that shows the correspondence relationship between a dot size, dot recognizability, and a measured density value.

Figure 11:
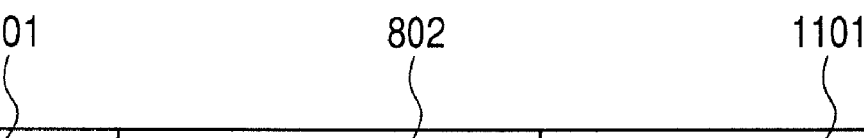
FIG. 11 illustrates a dot definition table including dot recognizability and measured density values.

FIG. 11 illustrates a dot definition table created in the processing at step 505-1 that shows the correspondence relationship between a dot size, the result of determination of whether dot recognition is possible or not (dot recognizability), and a measured density value.

An index 801 corresponds to each dot size to be checked. In 802, the result of determination of whether dot recognition is possible or not is stored. In 1101, a measured density value is stored. A measured density value stored in 1101 is a normalized value between 0 and 255 of a density between 0 and 2.0 which results from density measurement with the sensor.

In this manner, measured density values are further stored in the dot definition table in the dot decision processing 2 of the second embodiment.

Printing Processing of an Encoded Image

Figure 12:
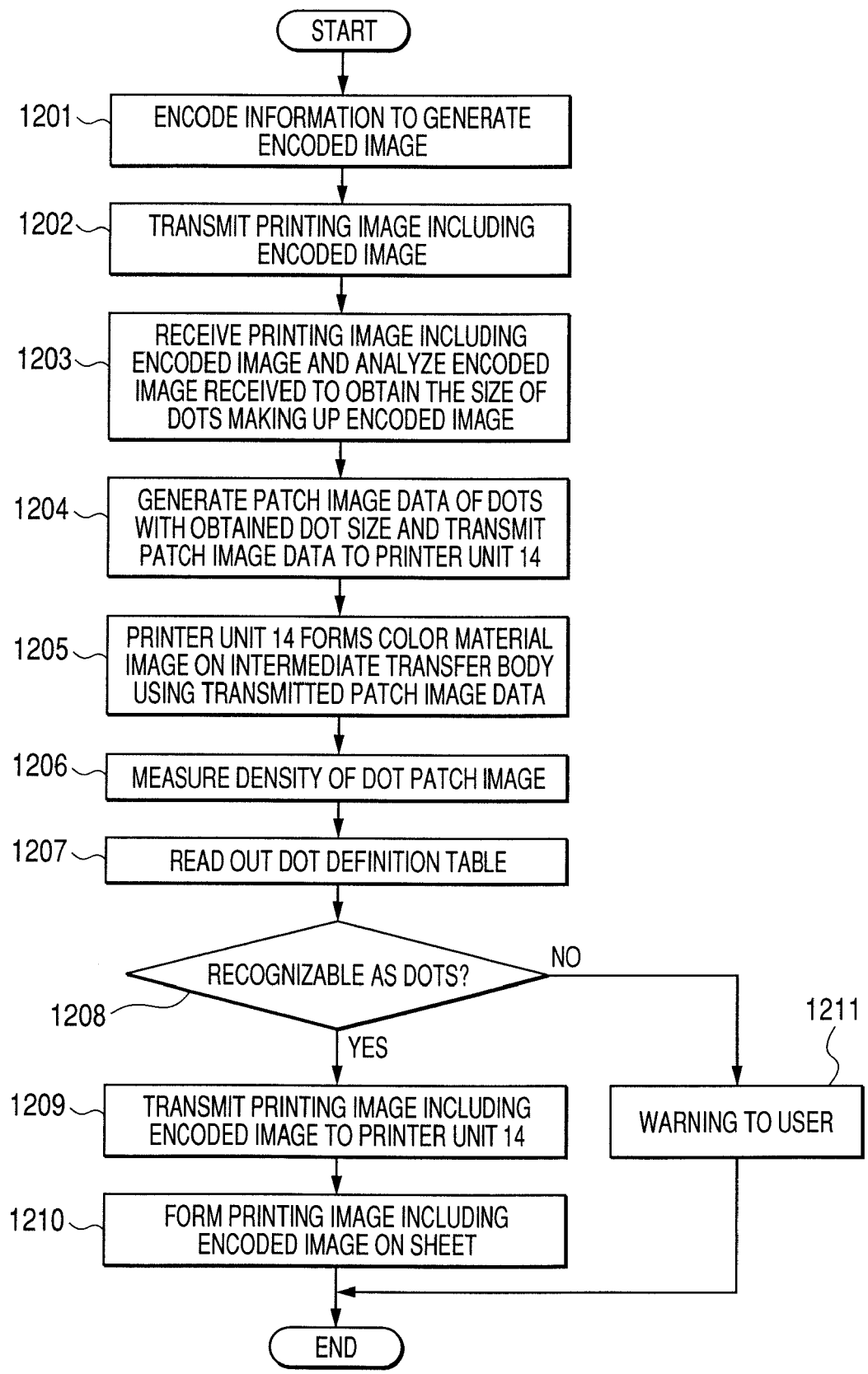
FIG. 12 is a flowchart showing printing processing of a printing image including an encoded image.

FIG. 12 illustrates a process flow of printing processing of a printing image including an encoded image.

Figure 13:
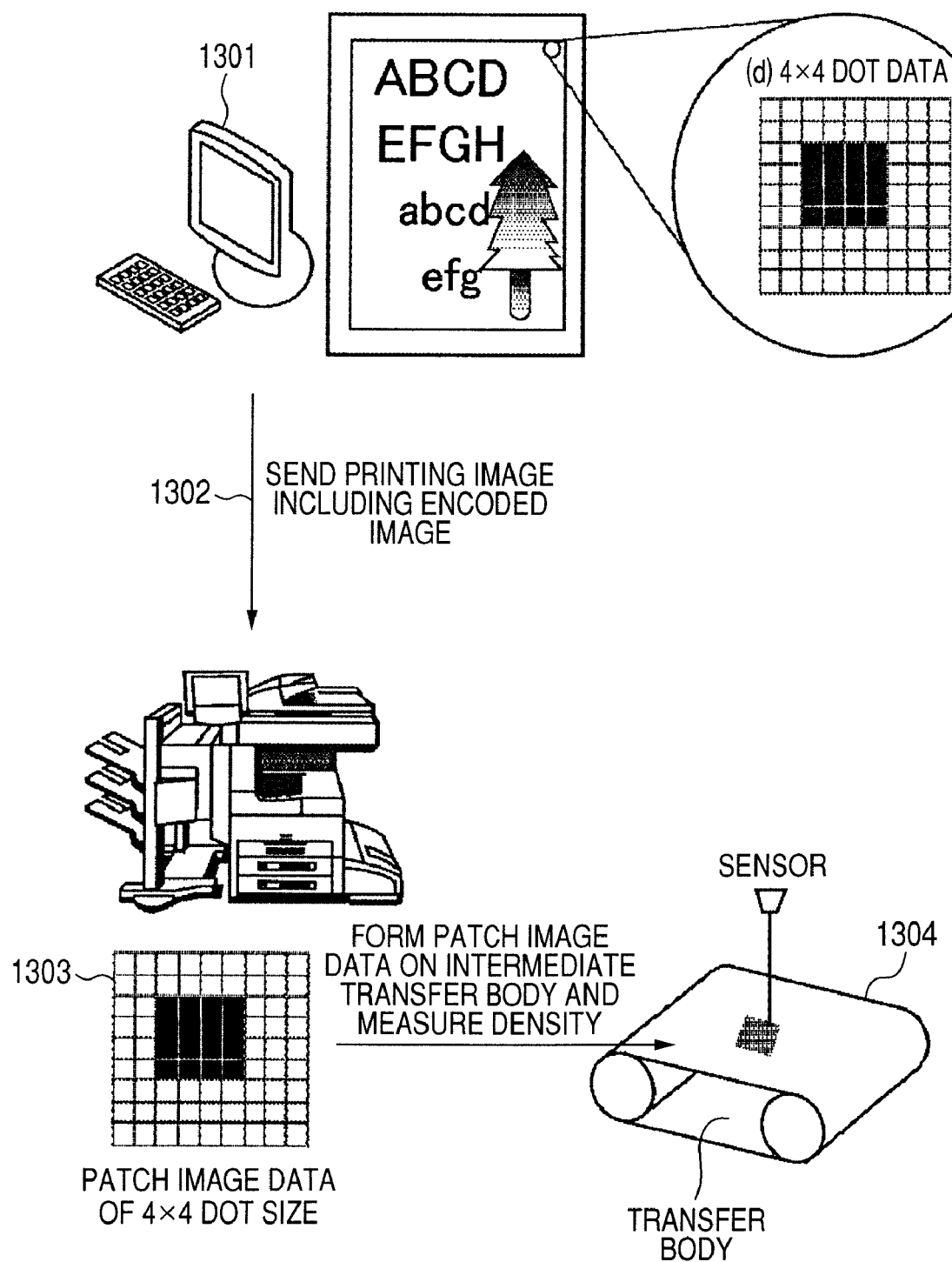
FIG. 13 illustrates generation of a printing image including an encoded image on a PC.

At step 1201, the PC 40 encodes information as the target of encoding (e.g., the contents of a document, a PIN code, a device number, printing time information, and user ID information) to generate an encoded image (1301 of FIG. 13).

Here, it is assumed that the PC 40 generates the encoded image data with a dot size defined inside the PC 40.

At step 1202, document image data is combined with the generated encoded image data to generate printing image data, and the printing image data is transmitted to the image forming apparatus 10 (1302 of FIG. 13).

At step 1203, the image forming apparatus 10 receives the printing image data including the encoded image data via the data transmission/reception unit 303, and analyzes the encoded image data included in the received printing image data to obtain the size of dot data that makes up the encoded image data.

At step 1204, patch image data that includes dot data having the same size as the obtained size is generated, and the generated patch image data is sent to the printing unit 14. In this way, the dot data generated at step 1204 is based on the dot data that makes up the encoded image.

At step 1204, if the analysis at step 1203 shows that the size of dot data is 4×4, for example, patch image data including 4×4 dot data is generated (1303 of FIG. 13) and transmitted.

At step 1205, the printing unit 14 receives the patch image data via the output unit I/F 311. Then, having received the patch image data, the printing unit 14 forms a color material image on the intermediate transfer body in the printing unit 14 using the patch image data.

At step 1206, the printing unit 14 measures the density of the color material image (i.e., the patch image on the intermediate transfer body) using the sensor 1002 in the printing unit 14 to obtain a measured density value (1304 of FIG. 13).

At step 1207, the dot definition table generated at step 905-1 in the dot size decision processing 2 is read from the RAM 307.

At step 1208, based on the dot definition table read out and the measured density value obtained, it is determined whether the dot data making up the encoded image data can be recognized as dots when printed on a sheet. In other words, it is decided at step 1208 whether formation onto a sheet using the encoded image data is appropriate or not based on the dot definition table read out and the measured density value obtained.

More specifically, the following processing is performed at step 1208.

First, using the dot definition table illustrated in FIG. 11, it is determined whether or not the measured density value obtained at step 1206 is greater than a measured density value that corresponds to the smallest dot size among dot sizes that can be recognized as dots determined at step 905-2. That is, a measured density value corresponding to the smallest dot size among dot sizes that can be recognized as dots, which have been determined at step 905-2, will serve as a threshold value.

The dot definition table illustrated in FIG. 11 that shows the relationship between dot recognizability and measured density values indicates that dot recognition is possible when a measured density value is equal to or greater than 30 and dot recognition may be impossible when a measured density value is less than 30.

Accordingly, at step 1208, if the measured density value obtained at step 1206 is 25 (<30), for example, it is determined that dot recognition is impossible. That is, it is decided that formation onto a sheet using the printing image data including the encoded image data is inappropriate. If the measured density value obtained at step 1206 is 40 (>30), for example, it is determined that dot recognition is possible. That is, it is decided that it is appropriate to form the printing image data including the encoded image data on a sheet.

If the determination at step 1208 shows that dot recognition is possible, the operation proceeds to step 1209, where the printing image data including the encoded image data is sent to the printer unit 14. Then, at step 1210, the printer unit forms a color material image on the intermediate transfer body using the printing image data including the encoded image data, and transfers the formed color material image from the intermediate transfer body onto a sheet so as to form the color material image on the sheet.

On the other hand, if the determination at step 1208 shows that dot recognition is impossible, the operation proceeds to step 1211. At step 1211, as illustrated in FIG. 14, the user is warned that the dots of the encoded image may not be recognized as dots with the currently set dot size through display on one of the operation unit 12 and the PC 40, and the processing is terminated. More specifically, a warning screen is transmitted to the operation unit 12 via the operation unit I/F 310, and the operation unit 12 displays the warning screen, thereby terminating the processing.

While in this embodiment printing image data including encoded image data is generated by an application or a printer driver on the PC 40, the present invention is effective for printing image data stored in the internal storage unit (HDD) 302 of the image forming apparatus as well.

In addition, in this embodiment, the image forming apparatus 10 obtains the size of dot data making up encoded image data by analyzing the encoded image data at step 1203. However, the present invention is not limited thereto. For example, encoded image data may be analyzed on the PC 40 side, not on the image forming apparatus 10, to obtain the size of dot data making up the encoded image data. Then, information on the size of the dot data may be transmitted to the image forming apparatus 10 together when the printing image data including the encoded image data is transmitted to the image forming apparatus 10. Alternatively, the size of dot data which is used in generation of encoded image data may be stored on the PC 40 side, and information on the dot size may be transmitted to the image forming apparatus 10 together when printing image data including the encoded image data is transmitted to the image forming apparatus 10.

As has been described above, in this embodiment, even when there is information indicating that dot recognition is possible with (D) 4×4 dot size (see FIG. 11), the information is not used for deciding whether encoded image data should be printed or not. This is because, as mentioned above, the relationship between the dot sizes shown in 801 and information on dot recognizability shown in 802 changes with time.

Instead, this embodiment decides whether encoded image data should be printed or not by using information indicating that dot recognition is possible when a measured density value is 30 or greater (see FIG. 11). This is because the relationship between the density of a color material on the intermediate transfer body and the density of the color material on a sheet does not change so much, and hence the relationship between the density of the color material on the intermediate transfer body and dot recognizability does not change so much.

In other words, since the relationship between the density on the intermediate transfer body and dot recognizability is reliable, this embodiment performs such processing as follows. Specifically, dots are formed on the intermediate transfer body using dot data that makes up encoded image data included in transmitted printing image data. Then, if the density of the dots on the intermediate transfer body exhibits a value equal to or greater than a density on the intermediate transfer body that has been determined to enable dot recognition, printing of a printing image including the encoded image is permitted.

In addition, on the image forming apparatus of this embodiment, dots are formed on a photoconductor drum before dots are formed on the intermediate transfer body. Accordingly, whether to print or not may also be decided by determining the density of dots on the photoconductor drum rather than the density of dots on the intermediate transfer body. In the present specification, such an intermediate transfer body and a photoconductor drum are collectively called an intermediate body.

Other Embodiments

The present invention is also applicable to a system made up of a number of devices (e.g., computers, interface devices, readers, printers), or to an apparatus made up of a single device (e.g., a multi-function machine, printer, and facsimile machine).

The object of the invention is also attained by a computer in a system or an apparatus (or a CPU or an MPU) reading and executing a program code that realizes the procedures of the flowcharts illustrated in the above-described embodiments from a storage medium which has stored therein the program code. In this case, the program code read from the storage medium itself realizes the functions of the embodiments described above. Therefore, the program code and the storage medium storing the program code also represent an aspect of the present invention.

The storage medium for supplying the program code may be a floppy (a registered trademark) disk, hard disk, optical disk, magneto-optical disk, CD-ROM, CD-R, magnetic tape, non-volatile memory card, and ROM, for instance.

A case is also encompassed where not only execution of a program code read by the computer realizes the functions of the above-described embodiments but an operating system (OS) or the like running on the computer performs some or all of actual processing according to directions in the program code so as to realize the functions of the above-described above embodiments.

Furthermore, a program code read from a storage medium is written into memory provided in a function expansion board inserted into a computer or a function expansion unit connected to the computer. Then, based on directions from the program code, a CPU and the like provided in the function expansion board or unit performs some or all of actual processing so as to realize the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-343057 filed Dec. 20, 2006, which is hereby incorporated by reference herein in its entirety.

What is claimed is:

1. An image forming apparatus that forms dots on an intermediate body and transfers the dots formed on the intermediate body onto a sheet so as to form the dots on the sheet, the image forming apparatus comprising:
   an intermediate formation unit configured to form dots that are based on dot data representing encoded image data on the intermediate body; and
   a decision unit configured to decide whether or not an encoded image using the encoded image data should be formed on a sheet based on the density of the dots formed on the intermediate body by the intermediate formation unit,
   wherein the decision unit decides an encoded image using the encoded image data should be formed on the sheet when the density of the dots formed on the intermediate body by the intermediate formation unit is equal to or greater than a threshold value, and decides an encoded image using the encoded image data should not be formed on the sheet when the density of the dots formed on the intermediate body by the intermediate formation unit is less than the threshold value.

2. The image forming apparatus according to claim 1, further comprising:
   a processing unit configured to measure the density of a plurality of dots formed on the intermediate body each having a different size, and to transfer the plurality of dots onto the sheet so as to form a plurality of dots on the sheet;

a determination unit configured to determine a dot of the smallest size that can be recognized as a dot among the plurality of dots which are formed on the sheet by the processing unit by scanning the plurality of dots; and a threshold value decision unit configured to set as the threshold value a density which is measured when the dot determined by the determination unit to be the dot of the smallest size that can be recognized as a dot is present on the intermediate transfer body.

3. The image forming apparatus according to claim 1, further comprising an analysis unit configured to analyze encoded image data to obtain the size of dot data representing the encoded image data;

wherein dots that are formed on the intermediate body using dot data having the same size as the size of dot data obtained by the analysis unit are dots that are based on dot data representing the encoded image data.

4. A control method for an image forming apparatus that forms dots on an intermediate body and transfers the dots formed on the intermediate body onto a sheet so as to form the dots on the sheet, the control method comprising:

forming dots that are based on dot data representing encoded image data on the intermediate body; and deciding whether or not an encoded image using the encoded image data should be formed on a sheet based on the density of the dots formed on the intermediate body in the forming step, wherein the deciding step decides an encoded image using the encoded image data should be formed on the sheet when the density of the dots formed on the intermediate body in the forming step is equal to or greater than a threshold value, and decides an encoded image using the encoded image data should not be formed on the sheet when the density of the dots formed on the intermediate body in the forming step is less than the threshold value.

5. The control method according to claim 4, further comprising:

a processing step of measuring the density of a plurality of dots formed on the intermediate body each having a different size, and transferring the plurality of dots onto a sheet so as to form a plurality of dots on the sheet;

a determining step of determining a dot of the smallest size that can be recognized as a dot among the plurality of dots which are formed on the sheet in the processing step by scanning the plurality of dots; and a threshold value deciding step of setting as the threshold value a density which is measured when the dot determined in the determining step to be the dot of the smallest size that can be recognized as a dot is present on the intermediate transfer body.

6. The control method according to claim 4, further comprising:

an analyzing step of analyzing encoded image data to obtain the size of dot data representing the encoded image data, wherein dots that are formed on the intermediate body using dot data having the same size as the size of dot data obtained in the analyzing step are dots that are based on dot data representing the encoded image data.

7. A non-transitory computer-readable storage medium that stores a program for causing a computer to execute a control method according to claim 4.

8. A non-transitory computer-readable storage medium that stores a program for causing a computer to execute a control method according to claim 5.

9. A non-transitory computer-readable storage medium that stores a program for causing a computer to execute a control method according to claim 6.

* * * * *